United States Patent [19]

Suffi et al.

[11] Patent Number: 4,827,502
[45] Date of Patent: May 2, 1989

[54] ENVIRONMENTALLY PROTECTED HOUSING FOR USING CENTRAL OFFICE PROTECTOR MODULES OUTDOORS

[75] Inventors: Louis Suffi, Westchester; Robert H. Dawson, Lake Bluff, both of Ill.

[73] Assignee: Reliance Comm/Tec Corporation, Chicago, Ill.

[21] Appl. No.: 39,653

[22] Filed: Apr. 16, 1987

[51] Int. Cl.[4] .................... H04M 3/00; H05K 5/02
[52] U.S. Cl. .................... 379/331; 361/119; 361/426; 379/330
[58] Field of Search ............. 379/331, 332, 437, 438, 379/451, 330; 361/119, 426; 174/52 PE

[56] References Cited

U.S. PATENT DOCUMENTS

| | | | |
|---|---|---|---|
| 3,383,565 | 5/1968 | Gritton | 174/52 PE |
| 3,564,164 | 2/1971 | Prescott | 174/52 PE |
| 3,584,106 | 6/1971 | Miller | 174/52 PE |
| 3,784,728 | 1/1974 | Debortoli et al. | 361/426 X |
| 4,371,757 | 2/1983 | Debortoli et al. | 361/426 X |
| 4,414,606 | 11/1983 | Anderson et al. | 174/52 PE |
| 4,591,950 | 5/1986 | Houpt | 361/426 X |

FOREIGN PATENT DOCUMENTS

| | | | |
|---|---|---|---|
| 3026811 | 2/1982 | Fed. Rep. of Germany | 174/52 PE |
| 2478935 | 9/1981 | France | 174/52 PE |

OTHER PUBLICATIONS

"WeatherGuard Outdoor Building Entry Protector"-'-Northern Telecom, Product Information Bulletin No. 423A, Issue No. 2, June 1985 (4 pages).

Primary Examiner—Thomas W. Brown
Attorney, Agent, or Firm—Michael M. Rickin

[57] ABSTRACT

An environmentally protected housing for receiving a connector block in which a multiplicity of central office protector modules can be mounted. The housing is designed such that its surface area is slightly larger than the surface area of the connector block and when the block and modules are mounted in the housing the top of the modules is just below the cover of the housing. Telephone cables which are used to connect to the cables from the central office and from the subscribers enter the housing and are wired to the rear of the connector block. The connector block is mounted in the housing and the modules are placed therein. A potting compound is then poured in the bottom of the housing to thereby environmentally seal the terminals and connections thereto on the rear of the protector block. The housing has a cover which has a suitable seal on its inside surface. The closing of the cover provides the environmentally protected housing. There is a further housing in which the environmentally protected housing can be mounted.

14 Claims, 5 Drawing Sheets

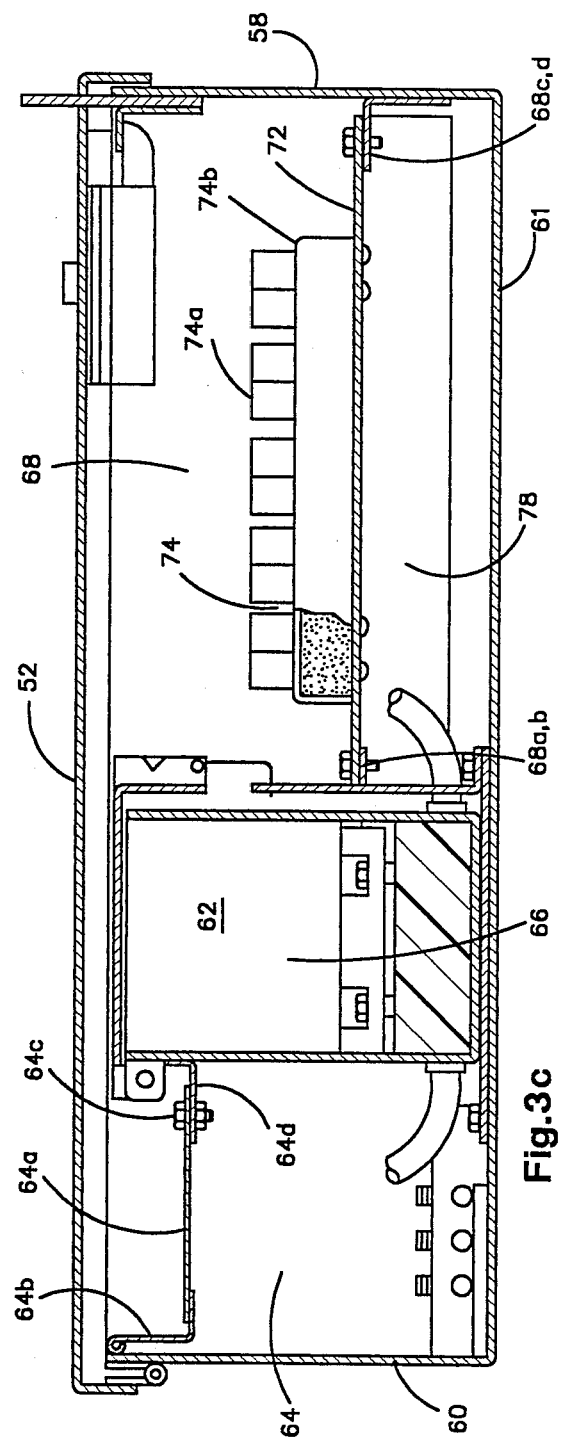
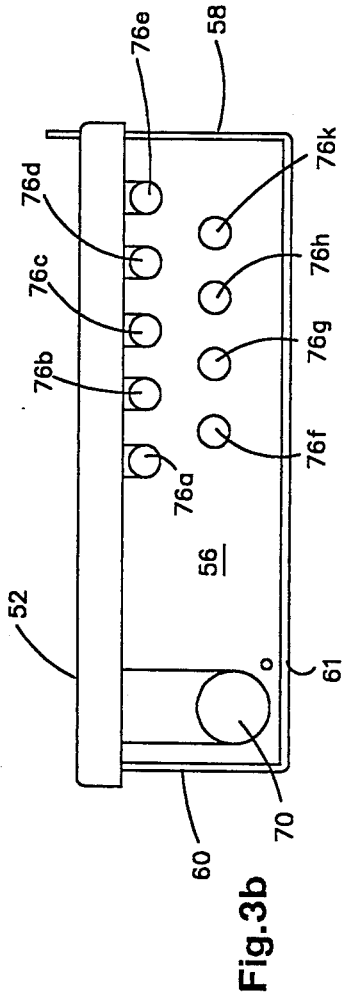
Fig.3c
Fig.3b

ENVIRONMENTALLY PROTECTED HOUSING FOR USING CENTRAL OFFICE PROTECTOR MODULES OUTDOORS

BACKGROUND OF THE INVENTION

1. Field of the Invention

The present invention pertains to housings and more particularly to a housing which is environmentally protected so that (Central Office) C.O. protector modules can be used outdoors.

2. Description of the Prior Art

Subscriber telephones and inside wiring have been protected from surges by the use of protectors in the form of overvoltage arresters. Those arrestors, also known as station protectors, are typically gas tubes which along with associated hardware are screwed into a housing. While station protectors do protect against surges, they do not provide all of the features available from the type of protector modules used at a telephone central office. Those modules, hereinafter C.O. protector modules, allow for the use of heat coils to protect against an overcurrent condition and are also capable of being partially removeable to cut off telephone service and yet still provide protection to the telephone line. This is known as the detent position. In contrast, station protectors protect only against overvoltages and do not have a detent position. Therefore, it is becoming increasingly desirable to use C.O. protective modules at the subscriber premises.

C.O. protector modules and the associated block in which they are inserted as well as other equipment such as terminal blocks, can be mounted indoors at the subscriber premises. In that case the protector modules and the associated block, as well as the cable pairs connected thereto, are not ordinarily exposed to undesirable environmental conditions such as extreme humidity, salt spray, etc. These conditions may cause corrosion which would interfere with the ability of the protector modules to perform the function for which they are installed. The basement or other location of a subscriber premise such as an apartment house, office building, etc. is very much like the telephone central office as far as reduced exposure to undesirable environmental conditions is concerned.

While C.O. protector modules and associated blocks can be installed indoors at the subscriber premises, telephone operating companies have found it more convenient to install them outdoors. Increased security has caused many of the indoor locations to be inaccessible to telephone company personnel. Mounting the protector modulues and blocks outdoors allows telephone company personnel to have access to them at any time of day. The outdoor mounting of the protector modules and blocks does, however, expose them to the various undesirable environmental conditions which may cause corrosion.

One solution to protecting the C.O. protector modules from the effects of the environment when used outdoors is to seal the modules. This sealing protects the modules from the environment but does not environmentally protect the block (including the cable pairs). In addition, an environmentally sealed module can be replaced by a standard, i.e., nonenvironmentally sealed module, as both types of modules can fit into the block. Therefore, any benefit that results from having an environmentally sealed module may be lost by either substitution of a standard module or corrosion occurring on the block and/or cables connected thereto.

It is desirable for use outdoors to have environmentally protected block and cables. It is also desirable to be able to use standard C.O. modules in such a block. Finally, it is desirable to environmentally protect the standard modules. The housing of the present invention provides such an arrangement.

SUMMARY OF THE INVENTION

An enviromentally protected housing for receiving a connector block. The block has a predetermined shape, a front face for receiving a multiplicity of central office protector modules and a rear facing having a multiplicity of outwardly projecting terminals to which wires of at least first and second cables can be connected.

The housing has a bottom and a side wall which is attached to the bottom and completely encloses the bottom to form a hollow structure. The structure has a predetermined shape which is the same as the predetermined shape of the connector block. The structure also has a predetermined depth. Finally, the structure has a surface area which is slightly larger than the surface area of the connector block.

Mounted in the structure at a depth which is less than the predetermined depth are standoffs. The connector block has means for mounting the block to the standoffs such that the block and the multiplicity of modules project upwardly a distance which is slightly less than the difference between the predetermined depth and the predetermined distance. A potting compound can then be placed in the area between the rear of the block and the bottom of the housing.

The housing further includes means by which the first and second cables can enter the structure. It also includes a cover which has a seal on its inside for completely enclosing the structure when the cover is placed over the structure.

DESCRIPTION OF THE DRAWING

FIGS. 3a to 3c show various views of one embodiment of a further housing in which the housing of the present invention can be mounted.

DESCRIPTION OF THE PREFERRED EMBODIMENT

Figure 1:
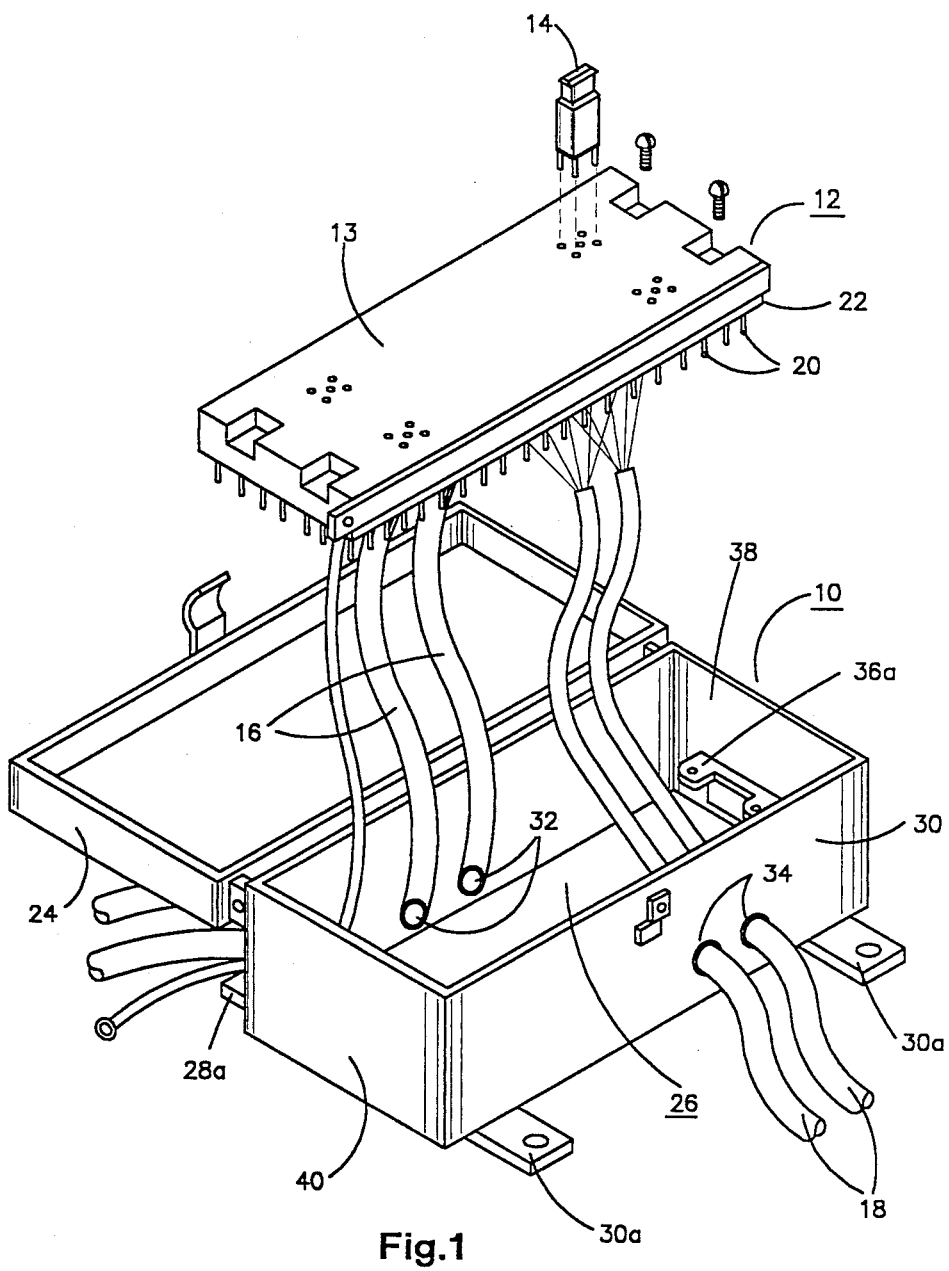
FIG. 1 shows an elevated perspective view of a housing in accordance with the present invention.

Referring now to FIG. 1 there is shown an elevated perspective view of a housing 10 in which a connector block 12 of the type capable of receiving a multiplicity of C.O. protector modules 14 can be mounted. Only one such module is shown in FIG. 1 for ease of illustration. Also shown in FIG. 1 are the cables 16, 18 which enter housing 10 for wiring to the pins 20 on the rear 22 of block 12 in a manner well known in the art. One of the cables 16 is connected at the end not connected to the rear of block 12 to the cable pairs coming from the C.O. The other of the cables 18 is connected at the end not connected to the rear of block 12 to the cables pairs coming from the various subscriber premises. The wiring of the cables 16, 18 to the rear of block 12 and the installation of a multiplicity of C.O. protector modules in the holes on front 13 of block 12 to provide protection against surges are both accomplished in a manner well known in the art.

Figure 2A:
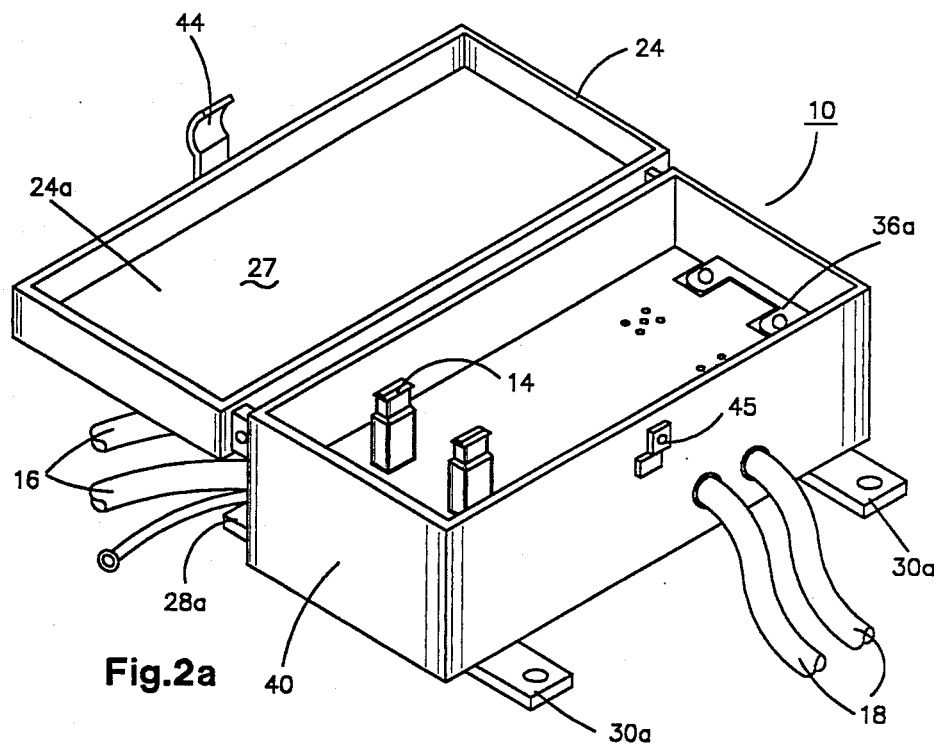
FIGS. 2a to 2c show various views of the housing of FIG. 1 with a connector block and cables therein.
Figure 2B:
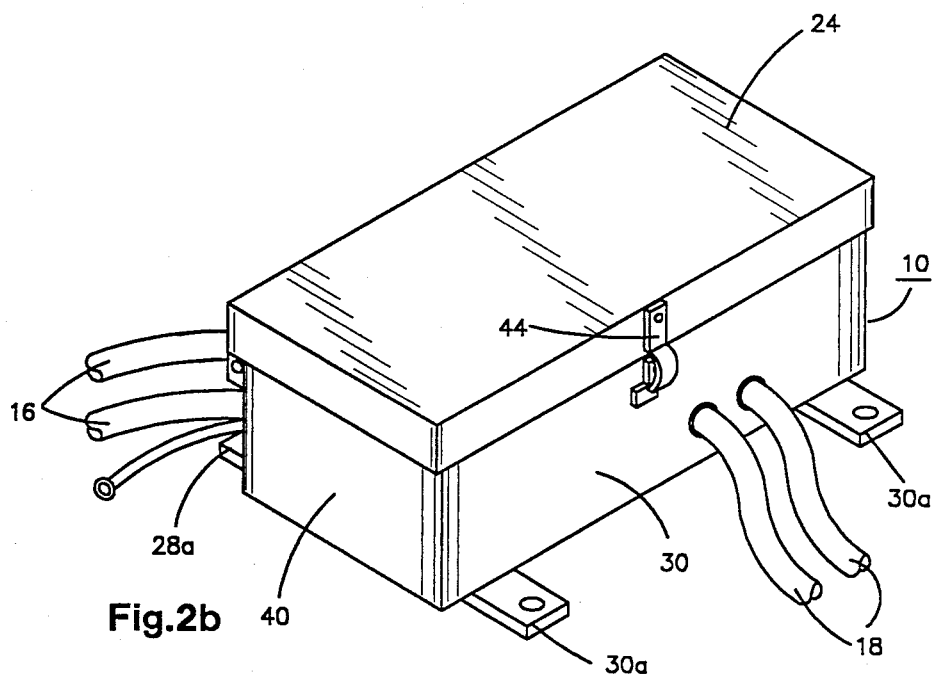
Figure 2C:
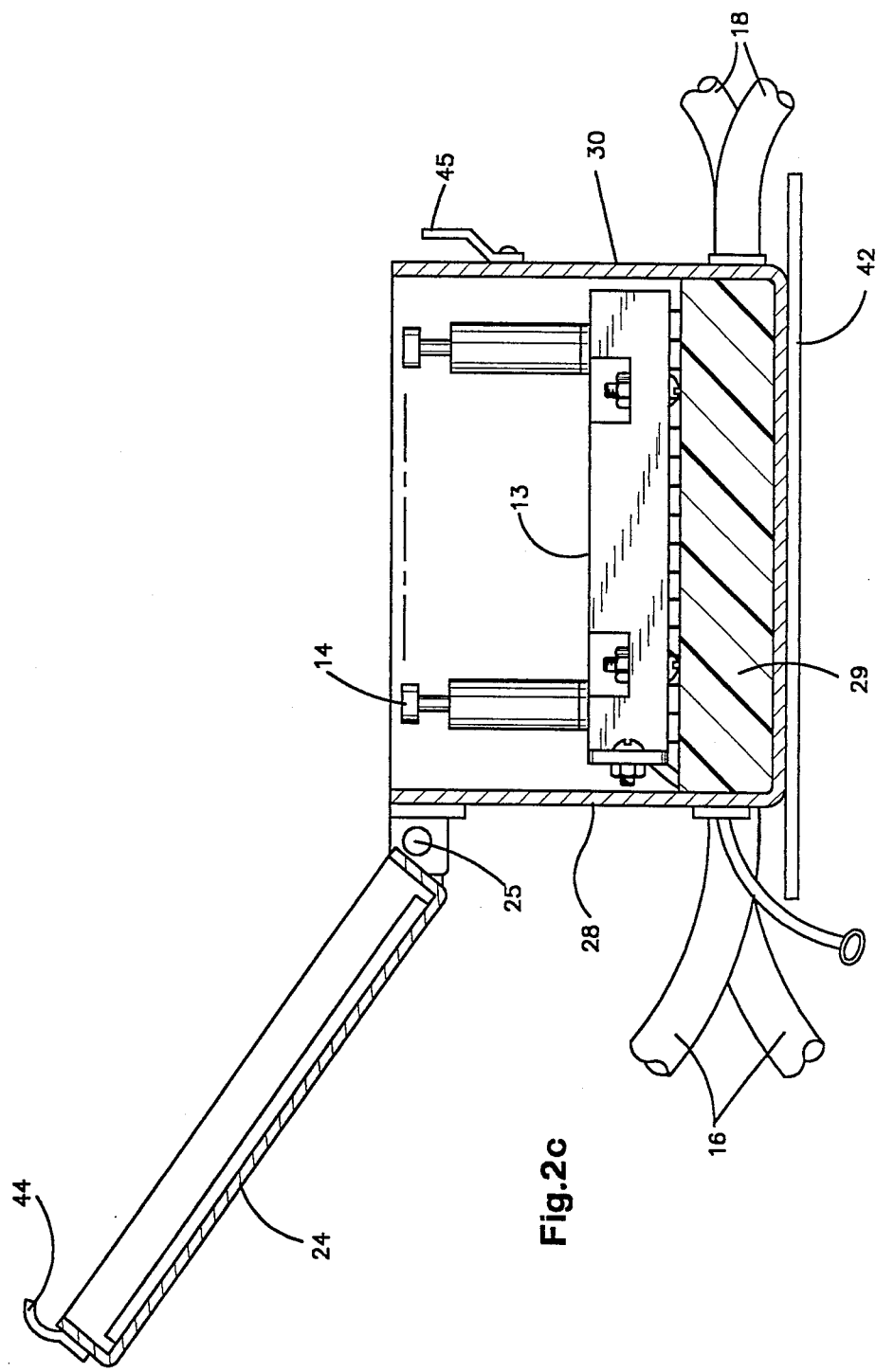

In FIGS. 2a to 2c, there are shown various views of housing 10 with block 12 and cables 16, 18 installed. In FIG. 2c a section has been taken through the lower side 40 of housing 10 so that the interior of housing 10 can be more easily seen. Housing 10 has a cover 24 which is hingedly attached by suitable means 25 to one side of the housing. Housing 10 is generally rectangular in shape to thereby form a chamber 26 (most clearly shown in FIG. 1) in which block 12 can be mounted. The right and left sides 28, 30 of housing 10 have one or more openings 32, 34, respectively, by which the cables 16, 18, respectively, can enter the housing 10. Each of sides 28, 30 also have associated therewith one or more flanges 28a, 30a by which housing 10 can be attachedly mounted in a further housing 50. One such further housing 50 will be described hereinafter. Each of the flanges have one or more holes (unnumbered) so that fasteners such as screws can be used to attach housing 10 to the further housing 50.

As described above, housing 10 is generally rectangular in shape. Chamber 26 is designed to be just slightly larger than block 12. As shown most clearly in FIG. 1, chamber 26 includes upper standoffs 36a and lower standoffs 36b (not shown but otherwise identical to standoffs 36a) connected to the upper and lower sides 38, 40 of housing 10 such that block 12 can be mounted in chamber 26 above the rear 42 of housing 10. Chamber 26 has a depth of about 3.5 inches (88.9 mm) and the standoffs are about one inch (25.4 mm) above the bottom of housing 10.

Block 12 is typically wired to cables 16, 18 in the factory prior to insertion in chamber 26 of housing 10. As most clearly shown in FIG. 1, the cables 16, 18 are fed into chamber 26 through openings 32, 34. The pairs of wires in the cables are then pulled such that they come out of the front of the chamber. In this manner the cable pairs may then be easily wired to the rear of block 12 by conventional means. After the cable pairs have been wired and all connections have been checked and/or tested according to the usual practice, the cables 16, 18 are then pulled from outside the housing as block 12 is eased into chamber 26. When the block is seated in the chamber, it is then secured to standoffs 36a, 36b by suitable means such as screws. A potting compound is then poured into the chamber such that the area bounded by rear 42, sides 28, 30, 38, 40 and the rear 22 of block 12 is filled with the potting compound 29. The potting compound 29 when cured environmentally protects the exposed pairs of cables 16, 18 and their connections to the rear 22 of block 12.

C.O. protector modules 14 may then be inserted in block 12 at any convenient time after the events described above. In fact, the modules may already be in block 12 when the events described above are taking place, although it is probably easier to insert the block 12 in the chamber 26 and secure it without the modules 14 being inserted.

Housing 10 is further environmentally sealed from the effects of adverse conditions by including on the inside 24a of cover 24 a suitable seal 27 which may, for example, be made of neoprene. As described above, the dimensions of chamber 26 are just slightly larger than the dimensions of block 12. When secured in the chamber, block 12 and the potting compound occupy that part of the chamber which is below the rear 22 of block 12. The remaining unoccupied area of the chamber is between the front of block 12 and cover 24 has been designed to be just large enough to allow for modules 14 to be inserted in block 12 (see FIG. 2a). With the modules 14 inserted in block 12 and the cover 24 closed there is only about one-quarter inch of clearance between the tops of the modules and the inside of the cover. Cover 24 is provided with a suitable latching mechanism 44 such that when it is closed it may be locked in place as a result of engagement with latching mechanism 45 on side 30 of housing 10.

I have found that designing housing 10 such that the unoccupied area after the block 12 and modules 14 have been inserted in chamber 26 in combination with the potting compound 29 and the seal 27 on the inside of cover 24 provides an effective means to environmentally seal the modules, block and cable pairs so that they can be used outdoors. In this manner, conventional C.O. modules can be inserted in block 12 without fear that their protective function will be impaired by the effects of humidity, salt spray and other adverse environmental conditions, all of which may exist outdoors.

Figure 3A:
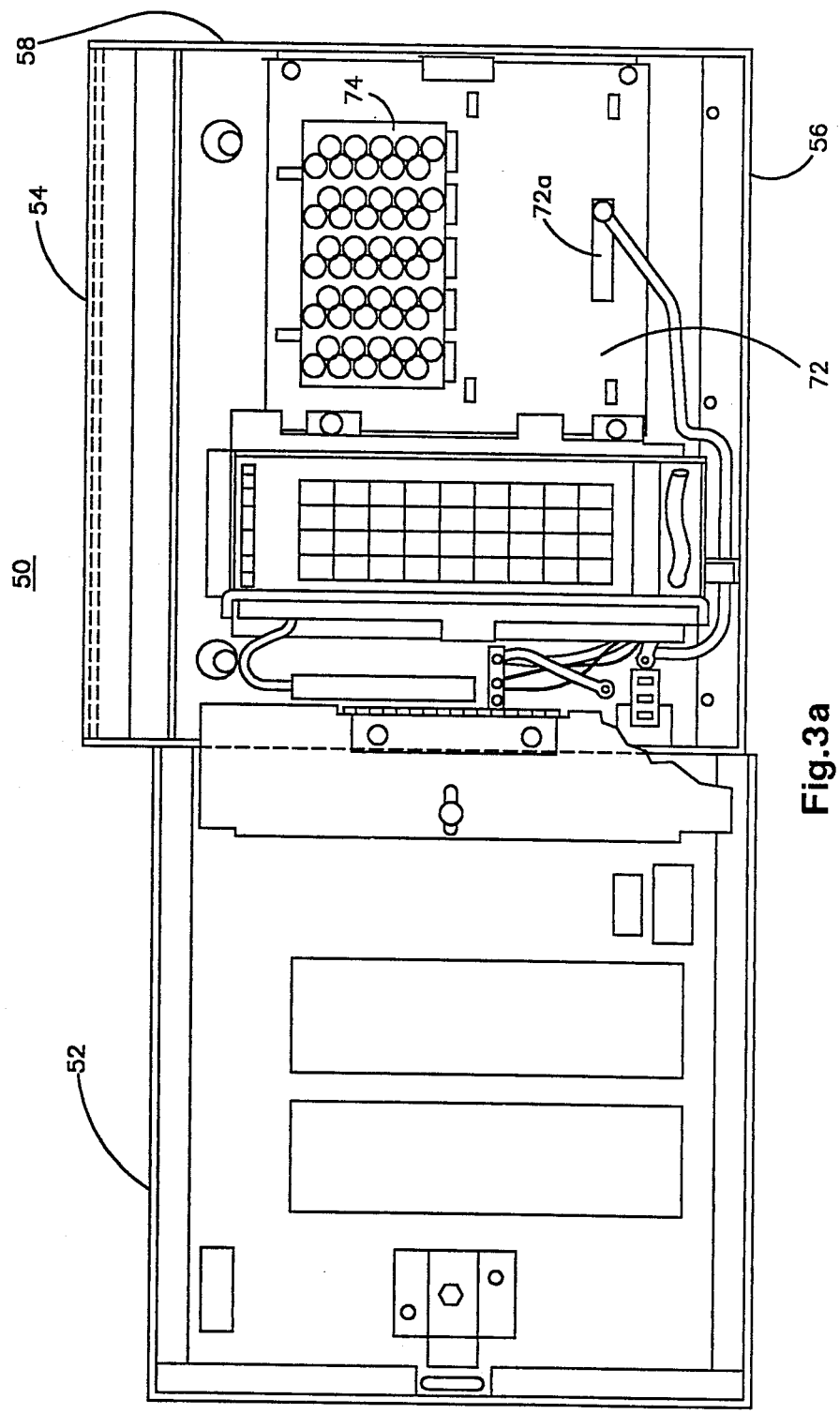

Referring now to FIGS. 3a to 3c there are shown various views of one embodiment of further housing 50 in which housing 10 has been mounted. Housing 50 is generally rectangular in shape and includes a cover 52 and upper, lower, right and left side walls 54, 56, 58 and 60, respectively, and a bottom 61 which in combination forms a chamber 62. The chamber 62 is divided into three portions 64, 66, 68. Housing 10 is mounted in portion 66 in the manner described previously. The other two portions 64, 68 of chamber 62 are used, respectively, to provide connections between the cable 16 of housing 10 and the cable from the central office and the cable 18 of housing 10 and the cable(s) to the subscriber premises.

The cable from the C.O. (not shown) enters housing 50 through opening 70 in the lower side wall 56 thereof (see FIG. 3b). Cable 16 of housing 10 and the C.O. cable are interconnected through the use of any one of a number of types of connectors well known in the art. Portion 64 includes a cover 64a which is hingedly mounted to a metal flange 64b parallel to left side wall 60 of housing 50. Flange 64b extends inwardly from cover 52 a predetermined distance such that cover 64a is recessed below cover 52. Cover 64a also includes a captured bolt 64c which interfits with an opening (not shown) in a flange 64d parallel to cover 52 to thereby allow cover 64a to be locked if desired.

Portion 68 includes four standoffs 68a, b, c, d projecting upwardly from bottom 61. A plate 72 is attached to the standoffs by suitable fasteners such as screws. Mounted on plate 72 is a termination block 74 which has a multiplicity of terminal connections 74a on its front face 74b. Plate 72 also includes a slot 72a so that cable 18 can be brought from underneath plate 72 to the multiplicity of terminal connections 74a. Housing 50 also contains a multiplicity of openings 76a to 76k in lower side wall 56 (see FIG. 3b). These openings allow one or more cables (not shown) from the subscriber premises to enter housing 50. The pairs of cable 18 are connected to the cable pairs from the subscribers at termination block 74.

As can be seen in FIG. 3c standoffs 68a, b, c, d in combination with bottom 61 allow a shallow chamber 78 to be formed when plate 72 is attached to the standoffs. Openings 76a to 76k are above chamber 78. It should be appreciated that while 76a to 76k have been referred to as openings they may, for example, be thin sheet metal which can easily be removed, i.e., punched out, prior to inserting the cables therein. In any case those openings which do not have cables going through them either still have their sheet metal therein or if it has been removed will have a suitable seal, e.g. rubber, in place of the sheet metal. Also as is well known in the art, suitable seals are used where necessary to seal those openings 50, 76a to 76k through which a cable enters housing 50.

While only a single termination block has been shown in FIGS. 3a, 3c, it should be appreciated that plate 72 and housing 50 can be designed to accommodate a multiplicity of those blocks. It should also be appreciated that housing 50 may not even contain a termination block 74 if the housing is of the well known stub in/stub out type.

It is to be understood that the description of the preferred embodiment is intended to be only illustrative, rather than exhaustive, of the present invention. Those of ordinary skill will be able to make certain additions, deletions, and/or modifications to the embodiment of the disclosed subject matter without departing from the spirit of the invention or its scope, as defined by the appended claims.

What is claimed is:

1. An environmentally protected housing for receiving a connector block, said connector block having a predetermined shape and surface area, said connector block also having a front face and a rear face, said front face having means for receiving a multiplicity of central office protector modules, said rear face having a multiplicity of outwardly projecting terminals to which wires of at least first and second cables can be connected, said housing comprising:
   (a) a bottom;
   (b) wall means attached to said bottom for completely enclosing said bottom to form a hollow structure having a predetermined shape which is the same as the predetermined shape of said connector block and a predetermined depth, said structure having a surface area which is slightly larger than said connector block surface area;
   (c) connector block receiving means mounted in said hollow structure such that when said connector block is attached thereto said block rear face is above said housing bottom by a predetermined distance which is less than said predetermined depth, said block including means for mounting said block to said receiving means such that when said block is mounted on said receiving means said multiplicity of modules project upwardly a distance which is slightly less than the difference between said predetermined depth and said predetermined distance and said rear face and said bottom defining an area for receiving said wires of at least said first and second cables and environmentally protecting compound after said wires are connected to said outwardly projecting terminals;
   (d) cable entry means for receiving said first and second cables in said structure;
   (e) a cover including sealing means on said cover's inside surface for completely enclosing said structure when said cover is placed over said structure; and
   (f) means on said housing exterior to said hollow structure for use in mounting said housing in a further housing.

2. The environmentally protected housing of claim 1 wherein said connector block predetermined shape is generally rectangular.

3. The environmentally protected housing of claim 1 wherein said connector block receiving means are mounted in said hollow structure on said wall means.

4. The environmentally protected housing of claim 1 wherein said exterior mounting means are attached to said housing bottom.

5. The environmentally protected housing of claim 1 wherein said cable entry means are in said wall means.

6. The environmentally protected housing of claim 2 wherein said cable entry means are in said wall means.

7. The environmentally protected housing of claim 1 wherein said cover includes means for hingedly attaching said cover to said wall means.

8. The environmentally protected housing of claim 1 wherein said further housing comprises:
   (a) a bottom;
   (b) wall means attached to said bottom for completely enclosing said bottom to form a hollow structure having a predetermined shape which is the same as said environmentally protected housing predetermined shape; and
   (c) means on said further housing bottom for receiving said environmentally protected housing mounting means.

9. An environmentally protected housing for mounting in a further housing, said environmentally protected housing comprising:
   (a) a hollow enclosure having a bottom and wall means attached to said bottom for completely enclosing said bottom, said enclosure also having a predetermined shape and surface area, and a predetermined depth;
   (b) a connector block having a front face, rear face and a predetermined shape and surface area which is the same as said hollow enclosure predetermined shape and slightly smaller than said hollow enclosure surface area, respectively, said connector block front face having means for receiving a multiplicity of central office protector modules, said connector block being mounted in said hollow enclosure such that said block rear face is above said hollow enclosure bottom by a predetermined distance which is less than said predetermined depth and said multiplicity of modules project upwardly a distance which is slightly less than the difference between said peredetermined depth and said predetermined distance;
   (c) a plurality of cables connected to said connector block rear face, said hollow enclosure having cable entry means for receiving said plurality of cables in said enclosure between said rear face and said enclosure bottom;
   (d) environmentally protecting compound between said block rear face and said enclosure bottom, said compound being introduced in said hollow enclosure only after said plurality of cables are connected to said connector block rear face;
   (e) a cover having sealing means on said cover's inside surface, said cover having a predetermined shape which is the same as said hollow enclosure predetermined shape; and
   (f) means on said environmentally protected housing exterior to said hollow enclosure for use in mounting said environmentally protected housing in said further housing.

10. The environmentally protected housing of claim 9 wherein said hollow enclosure predetermined shape is generally rectangular.

11. The environmentally protected housing of claim 9 wherein said exterior mounting means are attached to said hollow enclosure bottom.

12. The environmentally protected housing of claim 9 wherein said cable entry means are in said wall means.

13. The environmentally protected housing of claim 10 wherein said cable entry means are in said wall means.

14. The environmentally protected housing of claim 9 wherein said cover includes means for hingedly attaching said cover to said wall means.

* * * * *